United States Patent

Adcock et al.

[11] Patent Number: 5,835,894
[45] Date of Patent: Nov. 10, 1998

[54] SPEAKER AND COMMAND VERIFICATION METHOD

[75] Inventors: Sherrie Ann Adcock; Gerald S. Schwartz, both of Dana Point, Calif.

[73] Assignee: Ann Adcock Corporation, Dana Point, Calif.

[21] Appl. No.: 800,354

[22] Filed: Feb. 14, 1997

Related U.S. Application Data

[63] Continuation-in-part of Ser. No. 375,398, Jan. 19, 1995, abandoned.

[51] Int. Cl.$^6$ ......................................................... G10L 7/08
[52] U.S. Cl. .......................... 704/273; 704/274; 704/275; 704/254
[58] Field of Search .................................. 704/200, 251, 704/253, 254, 246, 242, 273, 500, 501, 502, 503, 275, 508, 274

[56] References Cited

U.S. PATENT DOCUMENTS

| | | | |
|---|---|---|---|
| 3,673,331 | 6/1972 | Hair et al. | 179/15 B |
| 3,896,266 | 7/1975 | Waterbury | 179/1 SB |
| 4,449,189 | 5/1984 | Feix et al. | 381/41 |
| 4,769,844 | 9/1988 | Fujimoto et al. | 381/42 |
| 4,827,520 | 5/1989 | Zeinstra | 381/43 |
| 4,833,713 | 5/1989 | Muroi et al. | 381/43 |
| 4,979,214 | 12/1990 | Hamilton | 381/46 |
| 5,050,215 | 9/1991 | Nishimura | 381/41 |
| 5,095,508 | 3/1992 | Fujimoto | 381/43 |
| 5,127,043 | 6/1992 | Hunt et al. | 379/88 |
| 5,199,080 | 3/1993 | Kimura et al. | 381/110 |
| 5,313,556 | 5/1994 | Parra | 395/2.55 |
| 5,345,538 | 9/1994 | Narayannan et al. | 395/2.84 |
| 5,381,512 | 1/1995 | Holton et al. | 395/2.41 |
| 5,465,308 | 11/1995 | Hutcheson et al. | 382/159 |

FOREIGN PATENT DOCUMENTS

| | | | |
|---|---|---|---|
| 1252567 | 4/1989 | Canada | G10L 5/06 |
| 135255 | 4/1979 | Germany | G10L 1/04 |
| 518791 | 7/1976 | U.S.S.R. | G10L 1/00 |
| 522512 | 7/1976 | U.S.S.R. | G10L 1/04 |

*Primary Examiner*—Richemond Dorvil
*Assistant Examiner*—Vijay B. Chawan
*Attorney, Agent, or Firm*—Gene Scott-Patent Law & Venture Group

[57] ABSTRACT

A security method compares a present verbal utterance with a previously recorded verbal utterance by comparing frequency domain representations of the utterances, with multiple repeat utterances forming a basis for determining a variation in repetitious performance by an individual, and similar differences between enrollment and challenge utterances forming a basis for a similar analysis of variance between enrollment and challenge utterances. In one embodiment a set of enrollment data is searched by each challenge until either a match is made, indicating an action, possibly dependent upon the specific match, or no match is made indicating an abort.

3 Claims, 1 Drawing Sheet

SPEAKER AND COMMAND VERIFICATION METHOD

This application is a continuation-in-part of a previously filed application Ser. No. 08/375,398 now abandoned filed on Jan. 19, 1995 and which is co-pending at the time of filing of this application.

BACKGROUND OF THE INVENTION

1. Field of the Invention

This invention relates generally to electronic security methods which provide for modeling or otherwise comparing human features such as fingerprints, voice patterns, and retina patterns, in order to distinguish between individuals, and, more particularly, to a security method and protocol for modeling and comparing voice utterances to control the operation of a security device.

2. Description of Related Art

The following art defines the present state of this field:

Parra, U.S. Pat. No. 5,313,556 describes the identity of an individual (known or unknown) that is determined by a sonic profile of sounds issued through his oral-nasal passages. The sounds are converted to digital electrical signals and produce a three domain format of frequency, amplitude and time samples to produce an array of peaks and valleys constituting the sonic profile of an individual. A source or library of sonic profiles in the same format of a known individual have a interrelationship including relative positions of said peaks and valleys of said sonic profile of the known individual with that of said unknown individual compared and a utilization signal is provided upon detecting or non-detecting a correlation between said sonic profiles.

Hair et al., U.S. Pat. No. 3,673,331 describes voice verification that is accomplished at a plurality of spaced apart facilities each having a plurality of terminals. Multiplexing structure interconnects the terminals through a communications link to a central processing station. Analog reproductions of voices transmitted from the terminals are converted into digital signals. The digital signals are transformed into the frequency domain at the central processing station. Predetermined features of the transformed signals are compared with stored predetermined features of each voice to be verified. A verify or non-verify signal is then transmitted to the particular terminal in response to the comparison of the predetermined features.

Waterbury, U.S. Pat. No. 3,896,266 describes a security card (which may be a credit card) according to the invention has recorded on it data identifying a personal and non-counterfeitable attribute, such as the voice characteristics, of the authorized holder of the card. A card utilization system according to the invention provides means for comparing the attribute as recorded by these data with the corresponding attribute of the person wishing to use the card, thereby substantially eliminating the possibility of unauthorized card utilization.

Muroi et al., U.S. Pat. No. 4,833,713 describes a voice or sound recognition system including a microphone for converting a voice into an electrical voice signal, a frequency analyzer for generating a voice pattern in the form of a time-frequency distribution, and a matching unit for matching the voice pattern with registered voice patterns.

Feix et al., U.S. Pat. No. 4,449,189 describes a method and an apparatus for identifying an individual through a combination of both speech and face recognition. The voice signature of an interrogated person uttering a key word into a microphone is compared in a pattern matcher with the previously stored voice signature of a known person uttering the same key word to obtain a first similarity score. At the same time, when a key event in the utterance of the key word by the interrogated person occurs, a momentary image of that person's mouth region onto which a grid pattern has been projected is optically recorded and compared with the previously stored corresponding momentary image of the same known person to obtain a second similarity score. The prior art teaches the comparing of voice signatures in time as well as frequency domain. However, the prior art does not teach a means for filtering such voice profiles by difference techniques. The present invention method fulfills these needs and provides further related advantages as described in the following summary.

SUMMARY OF THE INVENTION

The present invention teaches certain benefits in methods which give rise to the objectives described below.

The present invention is a security method which compares a present verbal utterance with a previously recorded verbal utterance by comparing frequency domain representations of the present utterance, with previously recorded multiply repeated utterances of the same material, forming a basis for comparison. Instead of comparing the utterances in the time domain, as is conventional, the present method approaches the comparison by establishing energy content in a variety of cells in the frequency domain, and instead of focusing on the ability of an individual to repeat an utterance from one trial to the next, sometimes separated by days, weeks or even longer, the present approach focuses on the variability of the difference between multiple utterances of the same words or phrases. Specifically, the method attempts to determine if two sounds were produced by the same human voice in an attempt to discriminate between allowed and non-allowed personnel seeking to operate a secure device. Further, the method may be used to determine what command is being given by the individual, culling out the selected command from a library of such commands all uttered by the same individual.

The present method invention has as an important aspect, the discrimination between, and, or matching of a presently uttered verbal word or phrase with the same utterance stored in a library of such utterancEs. Another aspect of the present method is the achievement of high accuracy and fast results in discrimination and, or matching of verbal utterances by using a difference method for comparison. The present method is a non-obvious and highly effective procedure for extremely high speed comparison of large data sets against a challenge so as to provide the convenience, for instance, of verbal only challenges at a secure door used by a large number of individuals with separate verbal access codes, wherein the delay time for approval has been shown to be in the range of a few seconds. The method also results in an extraordinary level of discrimination between individuals while providing a high level of "forgiveness" for the normal changes in tone, timber and volume of the human voice from moment to moment and day to day. The discrimination capability of the present method is strong enough for use in military as well as industrial applications, and is inexpensive and simple to use so as to find application in residential use. A further aspect of the present method is the use of testing for minimum energy levels in a set of frequency ranges in the frequency domain, as well as testing for corresponding energy levels that surpass a selected energy level criterion.

Other features and advantages of the present invention will become apparent from the following more detailed description providing an understanding of the principles of the invention.

DETAILED DESCRIPTION OF THE DISCLOSURE

Figure 1:
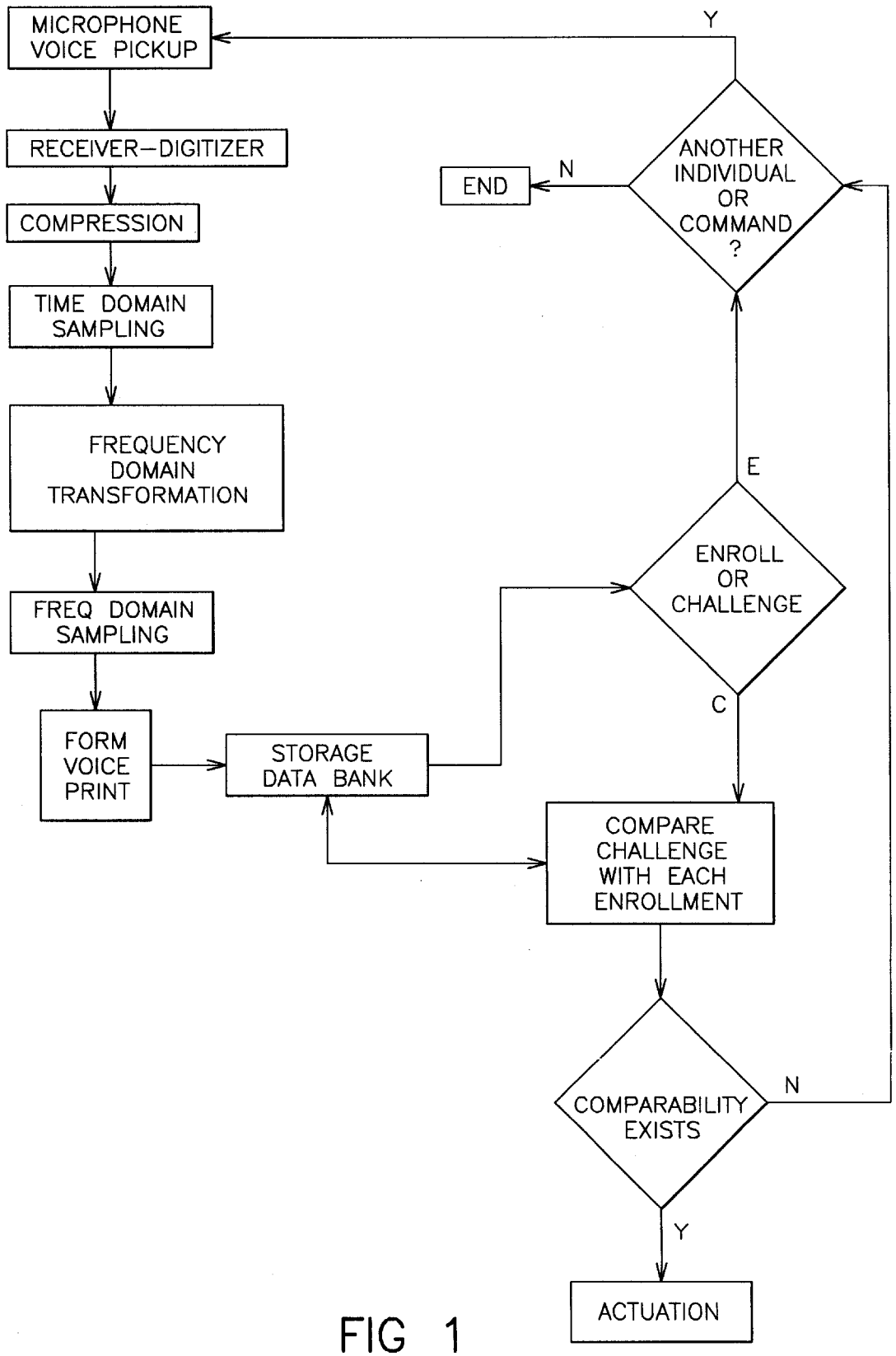

The present invention provides a step-by-step method for comparing a verbal utterance of a speaker in the present (challenge utterance), with a previously recorded verbal utterance (enrollment utterance), to determine the validity of the speaker, i.e., if the challenge utterance is being produced by the same person as was the enrollment utterance. When validity is determined, an action is authorized, such as opening a lock, dialing a secret phone number, etc. The method comprises certain steps which are taken in sequence. In summary the steps are defined by, first, preparing an enrollment data from an utterance from one or more persons, next, challenging the enrollment data with a present utterance from one of those persons, and finally enabling the security action if the challenge utterance is accepted as being close enough to one of the enrollment data.

Preparing the enrollment data comprises the steps of, converting a verbal utterance, which we shall refer to as an enrollment utterance, into a first electrical signal as by a microphone or other transducer, deleting portions of this signal which have zero signal level, creating a fast Fourier transformation of the signal to produce a frequency domain representation of the signal and then taking M samples of the signal for each of N frequency channels to form an M by N sample enrollment matrix $E_i$. M and N are selected as integers of a magnitude necessary for the level of security desired with larger numbers providing greater security and vice-versa. This matrix provides cell samples $M_i$-$N_i$, where i represents an integer, which are characterized by a total energy content within each cell, i.e., a number. Next, the method provides for determining if at least X, an arbitrary number, of the M samples have a selected minimum energy content in at least Y, another arbitrary number, of the N frequency channels. If not, the enrollment utterance is repeated until the criteria X and Y are satisfied, or if not, after several tries, the process of enrollment is aborted. This usually would only happen if the speaker is not able to provide enough volume in his or her speech to enable production of the minimum energy criterion or if the input is not a human voice so that a necessary spectral content is lacking.

When the enrollment is successful, the process is repeated until a selected number of the sample matrices, herein designated as $E_i$, have been formed and stored. We shall refer to these matrices as $E_1, E_2, E_3, \ldots$. Typically, we shall require at least three of these matrices in order to be satisfied with a successful enrollment of a voice utterance.

Next, the method requires forming the difference between each pair of the enrollment matrices $E_i$, as $(E_1-E_2)$, $(E_1-E_3)$, $(E_2-E_3)$, . . . . Thus, we have determined a variance or variability characteristic of the individual speaker in forming the enrollment utterances.

Finally, we form the sum, S, of the differences between each of the pairs of the matrices $E_i$, as $S=[(E_1-E_2)+(E_1-E_3)+(E_1-E_2)+\ldots]$, and accept S as an enrollment data only if $S<EB$, EB being a selected first enrollment criterion called the "enrollment basis," and also only if each of the differences between each pair of the matrices $E_i$ is greater than ES, ES being a selected second enrollment criterion called "enrollment span." The first part of this step is critical to the viability of the present method in that EB determines that the total energy in the differences, $E_1-E_2$ for example, must be less than the EB criterion or else we must consider that the variances in repetitive spoken utterances of the same material, for this individual, is too great to be useful in the present method. This is clearly a novel step, with respect to the prior art and is critical to the determination of correlation between an utterance spoken at one point in time relative to the same utterance spoken at another point in time. The second part of this step is also critical to the viability of the present method in that ES assures us that a recording is not being used as an impostor, i.e., we can be sure that the differences in the matrices are at least as great as would be normally expected from a human voice. When a recording is used for each of the enrollments, we find that variability between them is less than is produced by the human voice.

Challenging the enrollment data comprising the steps of, first, converting a challenge verbal utterance into a second electrical signal, deleting portions of the second signal which have zero signal level, creating a second fast Fourier transformation of the second signal to produce a frequency domain representation of the second signal and taking M samples of the second signal for each of N frequency channels to form an M by N sample challenge matrix C and determining if at least X of the M samples have a selected minimum energy content in at least Y of the N frequency channels. It is clear that these steps in the challenge are identical to the corresponding steps in the enrollment procedure. These challenge steps are repeating if the later test for minimum energy fails, and the challenge is aborted after a selected number of such repeats on the basis that an impostor is trying to crack the system and such an impostor should not be given as many tries as he/she would desire.

Next the difference between C and $D_i$ for each of the matrices $D_i$, as $(C-D1), (C-D2), (C-D3), \ldots$ is formed and then the sum, S', of the differences between each of the pairs C and $D_i$, as $S'=[(C-D1)+(C-D2)+(C-D3)+\ldots]$ is formed. These steps correspond to similar steps in the enrollment process. S' is accepted as a valid challenge if $S'<VB$, VB being a selected first verification criterion and also if each said difference between each of the pairs C and $D_i$ is greater than VS, VS being a selected second verification criterion. Both VB and VS play corresponding roles to EB and ES in the enrollment procedure and are used for the same reason. When these criteria are met the challenge verbal utterance is accepted and the requisite security step is enabled.

We have described the present method when used for an application where only one challenger is expected. In this case only one enrollment need be made. The objective in such a system is to assure that only the one enrolled individual can access the system by successfully challenging the method. All others, being impostors, must not be able to successfully challenge the method so that they are locked out of any security system using the method.

It is clear that such a system may use the method for a plurality of users at the same time when an enrollment is completed for each user. In this case, a challenge is made by any one of the users and the challenge method is then carried out for each of the enrollments until either a successful challenge is made or all of the enrollments have been tested without success.

It is also clear that each of the data sets may include a definition of a specific security action so that when a specific match is made between a challenge and an enrollment, the specific action may be carried out in deference to other actions corresponding to the other enrollments.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. A method of comparing a challenge verbal utterance with an enrollment verbal utterance to determine a security action, the method comprising the steps of:

A) preparing an enrollment data comprising the steps of:
  a) converting an enrollment verbal utterance into a first electrical signal;
  b) creating a fast Fourier transformation of the signal to produce a frequency domain representation of the signal;
  c) taking M samples of the signal for each of N frequency channels to form an M by N sample enrollment matrix Ei;
  d) determining if at least X of the M samples have a selected minimum energy content in at least Y of the N frequency channels;
  e) repeating steps (a) through (d) if step (d) fails, and aborting after a selected number of repeats of steps (a) through (d);
  f) repeating steps (a) through (d) if step (d) succeeds, until a selected number of said sample matrices Ei have been formed as E1, E2, E3 . . . . ;
  g) forming the difference between each pair of the enrollment matrices Ei, as (E1–E2), (E1–E3), (E2–E3), . . . ;
  h) forming the sum, S, of the differences between each of the pairs of the matrices Ei, as S={(E1–E2)+(E1–E3)+(E1–E2)+. . . };
  i) accepting S as an enrollment data if S<EB, EB being a selected first enrollment criterion and also if each said difference between each pair of the matrices Ei is greater than ES, ES being a selected second enrollment criterion;

B) challenging the enrollment data comprising the steps of:
  a) converting a challenge verbal utterance into a second electrical signal;
  b) creating a second fast Fourier transformation of the second signal to produce a frequency domain representation of the second signal;
  c) taking M samples of the second signal for each of N frequency channels to form an M by N sample challenge matrix C;
  d) determining if at least X of the M samples have a selected minimum energy content in at least Y of the N frequency channels;
  e) repeating steps (a) through (d) if step (d) fails, and aborting after a selected number of repeats of steps (a) through (d);
  f) forming the difference between C and Di for each of the matrices Di, as (C–D1), (C–D2), (C–D3), . . . ;
  g) forming the sum, S', of the differences between each of the pairs C and Di, as S'={(C–D1)+(C–D2)+(C–D3)+. . . };
  h) accepting S' as a valid challenge if S'<VB, VB being a selected first verification criterion and also if each said difference between each of the pairs C and Di is greater than VS, VS being a selected second verification criterion;

C) enabling the security action if the challenge verbal utterance is accepted.

2. A method of comparing a challenge verbal utterance with a set of enrollment verbal utterances to determine a security action, the method comprising the steps of:

A) preparing enrollment data comprising the steps of:
  a) converting an enrollment verbal utterance into a first electrical signal;
  b) creating a fast Fourier transformation of the signal to produce a frequency domain representation of the signal;
  c) taking M samples of the signal for each of N frequency channels to form an M by N sample enrollment matrix Ei;
  d) determining if at least X of the M samples have a selected minimum energy content in at least Y of the N frequency channels;
  e) repeating steps (a) through (d) if step (d) fails, and aborting after a selected number of repeats of steps (a) through (d);
  f) repeating steps (a) through (d) if step (d) succeeds, until a selected number of said sample matrices Ei have been formed as E1, E2, E3 . . . ,
  g) forming the difference between each pair of the enrollment matrices Ei, as (E1–E2), (E1–E3), (E2–E3), . . . ;
  h) forming the sum, S, of the differences between each of the pairs of the matrices Ei, as S={(E1–E2)+(E1–E3)+(E1–E2)+. . . };
  i) accepting S as an enrollment data if S<EB, EB being a selected first enrollment criterion and also if each said difference between each pair of the matrices Ei is greater than ES, ES being a selected second enrollment criterion;
  j) repeating steps (a) to (i) for a plurality of individual enrollment data sets;

B) challenging the enrollment data, the enrollment challenging comprising the steps of:
  a) converting a challenge verbal utterance into a second electrical signal;
  b) creating a second fast Fourier transformation of the second signal to produce a frequency domain representation of the second signal;
  c) taking M samples of the second signal for each of N frequency channels to form an M by N sample challenge matrix C;
  d) determining if at least X of the M samples have a selected minimum energy content in at least Y of the N frequency channels;
  e) repeating steps (a) through (d) if step (d) fails, and aborting after a selected number of repeats of steps (a) through (d);
  f) forming the difference between C and Di for each of the matrices Di, as (C–D1), (C–D2), (C–D3), . . . ;
  g) forming the sum, S', of the differences between each of the pairs C and Di, as S'={(C–D1)+(C–D2)+(C–D3)+. . . };
  h) repeating steps (a) through (g) for each of the enrollment data sets until S'<VB, VB being a selected first verification criterion, and each said difference between each of the pairs C and Di is greater than VS, VS being a selected second verification criterion;
  i) aborting the method when step (h) has been completed without the challenge verbal utterance being accepted;

C) enabling the security action if the challenge verbal utterance is accepted in step (B)(h).

3. The method of claim 2 wherein each of the data sets includes data defining a specific security action wherein upon completion of step (B)(h) a further step is taken to complete said specific security action, said action including the generating of an electrical signal.

* * * * *